United States Patent
Francisco et al.

(10) Patent No.: US 8,621,842 B2
(45) Date of Patent: Jan. 7, 2014

(54) EXHAUST SILENCER CONVECTION COOLING

(75) Inventors: Jay M. Francisco, Chula Vista, CA (US); Greg R. Giddings, San Marcos, CA (US); Anthony C. Jones, San Diego, CA (US); Nagamany Thayalakhandan, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 559 days.

(21) Appl. No.: 12/774,240

(22) Filed: May 5, 2010

(65) Prior Publication Data

US 2011/0271686 A1 Nov. 10, 2011

(51) Int. Cl.
*F02C 7/12* (2006.01)

(52) U.S. Cl.
USPC ............ 60/39.83; 60/226.1; 60/770; 60/39.5; 60/39.52; 181/213; 181/215; 181/220

(58) Field of Classification Search
USPC ................. 60/39.83, 226.1, 770, 39.5, 39.52; 181/213, 215, 220
See application file for complete search history.

(56) References Cited

U.S. PATENT DOCUMENTS

| | | | |
|---|---|---|---|
| 3,286,787 A | 11/1966 | Wirt | |
| 3,848,697 A | 11/1974 | Jannot et al. | |
| 4,645,032 A * | 2/1987 | Ross et al. | 181/250 |
| 5,265,408 A | 11/1993 | Sheoran et al. | |
| 6,092,360 A | 7/2000 | Hoag et al. | |
| 6,615,576 B2 * | 9/2003 | Sheoran et al. | 60/39.5 |
| 6,651,929 B2 | 11/2003 | Dionne | |
| 6,860,098 B2 | 3/2005 | Suenaga et al. | |
| 6,942,181 B2 * | 9/2005 | Dionne | 244/57 |
| 7,267,297 B2 | 9/2007 | Campbell et al. | |
| 7,337,605 B2 | 3/2008 | Hagshenas | |
| 7,578,369 B2 | 8/2009 | Francisco et al. | |
| 7,611,093 B2 | 11/2009 | Campbell et al. | |
| 7,665,310 B2 | 2/2010 | Laborie | |
| 8,025,122 B2 * | 9/2011 | Gilcreest et al. | 181/213 |
| 2005/0061378 A1 | 3/2005 | Foret | |
| 2006/0059891 A1 | 3/2006 | Sheoran et al. | |
| 2006/0180388 A1 * | 8/2006 | Brown et al. | 181/250 |
| 2007/0214767 A1 | 9/2007 | Napier et al. | |
| 2008/0041658 A1 * | 2/2008 | Kawahashi et al. | 181/262 |
| 2008/0044280 A1 | 2/2008 | Le Docte et al. | |

\* cited by examiner

*Primary Examiner* — Gerald L Sung
*Assistant Examiner* — Craig Kim
(74) *Attorney, Agent, or Firm* — Carlson, Gaskey & Olds, P.C.

(57) ABSTRACT

An example auxiliary power unit (APU) exhaust silencer includes cooling features to protect the outer skin and other components from heat generated by gases passing through an exhaust duct. Cooling air flow through a cooling air passage in thermal contact with the exhaust silencer carries heat away from other nearby components and the aircraft skin.

16 Claims, 4 Drawing Sheets

EXHAUST SILENCER CONVECTION COOLING

BACKGROUND

This disclosure generally relates to a noise attenuating exhaust nozzle for a gas turbine engine. More particularly, this disclosure relates to a cooled noise attenuating structure of an exhaust nozzle.

Aircraft may include an auxiliary power unit (APU) for powering various aircraft systems separate from the main propulsion engines. An APU is typically a gas turbine engine mounted within the aircraft structure. An exhaust silencer may be utilized to reduce noise generated by the APU and emitted through an exhaust duct. The exhaust duct and exhaust silencer operate at high temperatures and are therefore surrounded by insulating materials to protect surrounding components and structure. The insulating materials in turn occupy valuable space, add weight to the aircraft, and increase manufacturing costs.

SUMMARY

A disclosed example auxiliary power unit (APU) noise reduction system includes cooling features to protect the outer skin and other components from heat generated by gases passing through an exhaust duct.

The example APU noise reduction system includes an exhaust silencer disposed around an exhaust duct. Sound energy within the exhaust duct is communicated to the exhaust silencer where the sound energy is negated. A cooling air passage in thermal contact with the exhaust silencer carries heat away from other nearby components and the aircraft skin. In one example, air flow is created by a fan driving air through the air passages. In another example, an eductor creates a pressure differential that draws air through the passages and into the exhaust duct.

These and other features disclosed herein can be best understood from the following specification and drawings, the following of which is a brief description.

DETAILED DESCRIPTION

Figure 1:
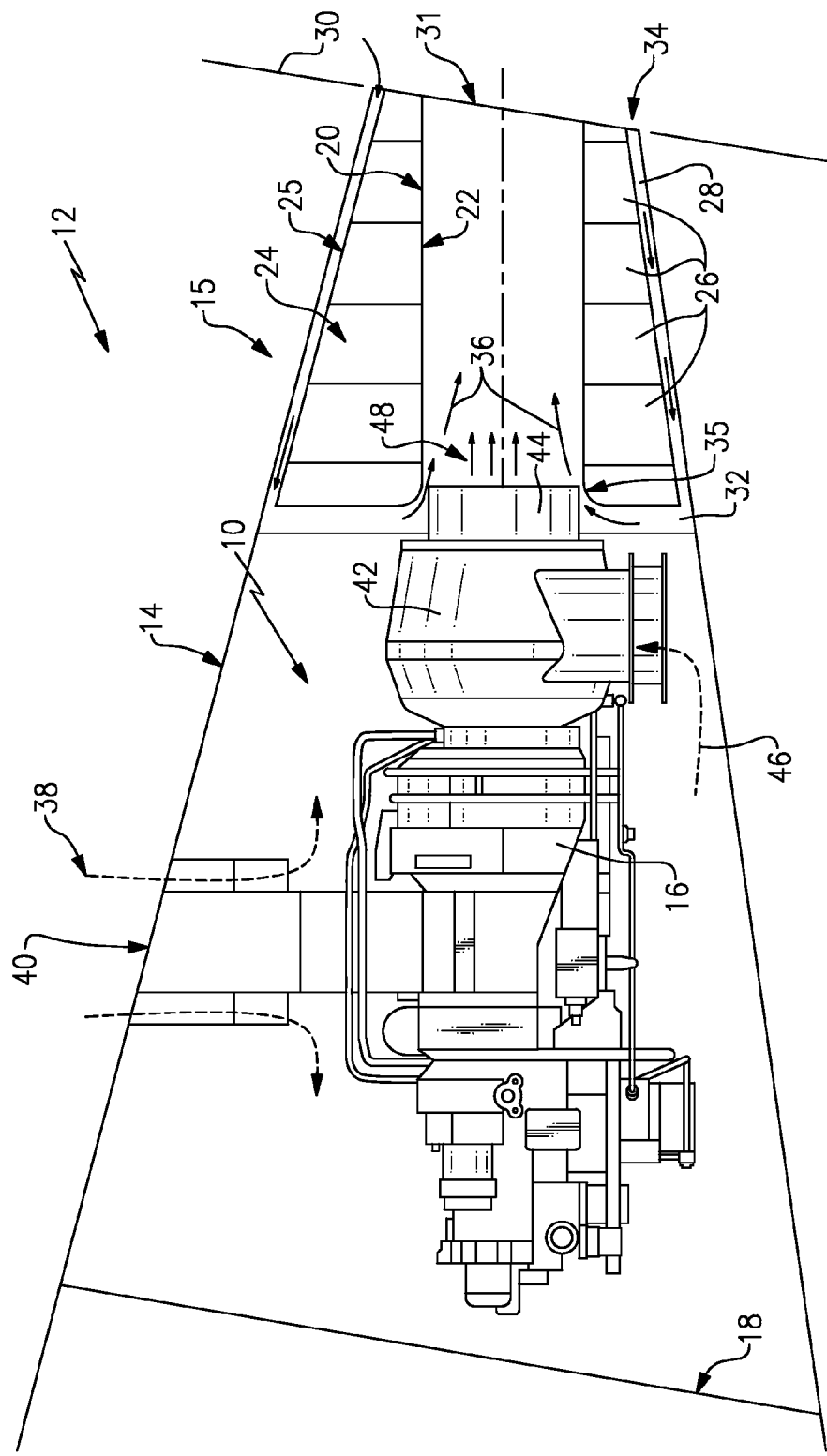
FIG. 1 is a schematic view of an example exhaust silencer.

Referring to FIG. 1, an auxiliary power unit (APU) noise reduction system is schematically indicated at 15 for reducing exhaust noise generated by an APU 10 and is disposed within an aircraft tail cone 12. The example aircraft tail cone 12 is defined by an outer skin 14. The example outer skin 14 is a sheet material that defines a portion of the outer surface of the example aircraft. The example outer skin 14 may be a sheet composite material, or a light weight metal such as aluminum, that is not intended for exposure to the high temperatures associated with exhaust gases generated by the APU 10. Accordingly, the example APU 10 includes convection cooling features to protect the outer skin 14 and other proximate aircraft components from heat generated by gases passing through an exhaust duct 20.

The example APU 10 includes a gas turbine engine 16 and may be of any known configuration, where the exhaust duct 20 is configured to receive exhaust gases from the gas turbine engine 16. Additionally, although the example APU 10 is illustrated and explained with regard to a location in an aircraft tail cone 12, the disclosed cooling features are applicable to other locations within an aircraft structure.

The example tail cone 12 is disposed at a rear portion of an aircraft and defines a compartment for the APU 10. The example compartment is defined on one end by a fire wall 18 and on an aft most point by an end plane 30. The end plane 30 includes an opening 31 at an aft open end of the exhaust duct 20. Operation of the APU 10 produces high temperature exhaust gases 48 and noise that are directed through the exhaust duct 20. An exhaust silencer 24, also referred to generally as noise attenuator 24, is provided about the exhaust duct 20 to reduce the amount of noise that emanates from the exhaust opening 31. The example silencer 24 is annular and surrounds the exhaust duct 20. The silencer 24 fills an annular space between the exhaust duct 20 and the outer skin 14 except for space for passage 28. Moreover, the silencer 24 can also be of a cylindrical shape that surrounds the exhaust duct 20. The primary noise source of the APU 10 is the gas turbine engine 16. Therefore, the APU noise reduction system 15 is also generally referred to as exhaust silencer cooling system 15 for the gas turbine engine 16.

Figure 2:
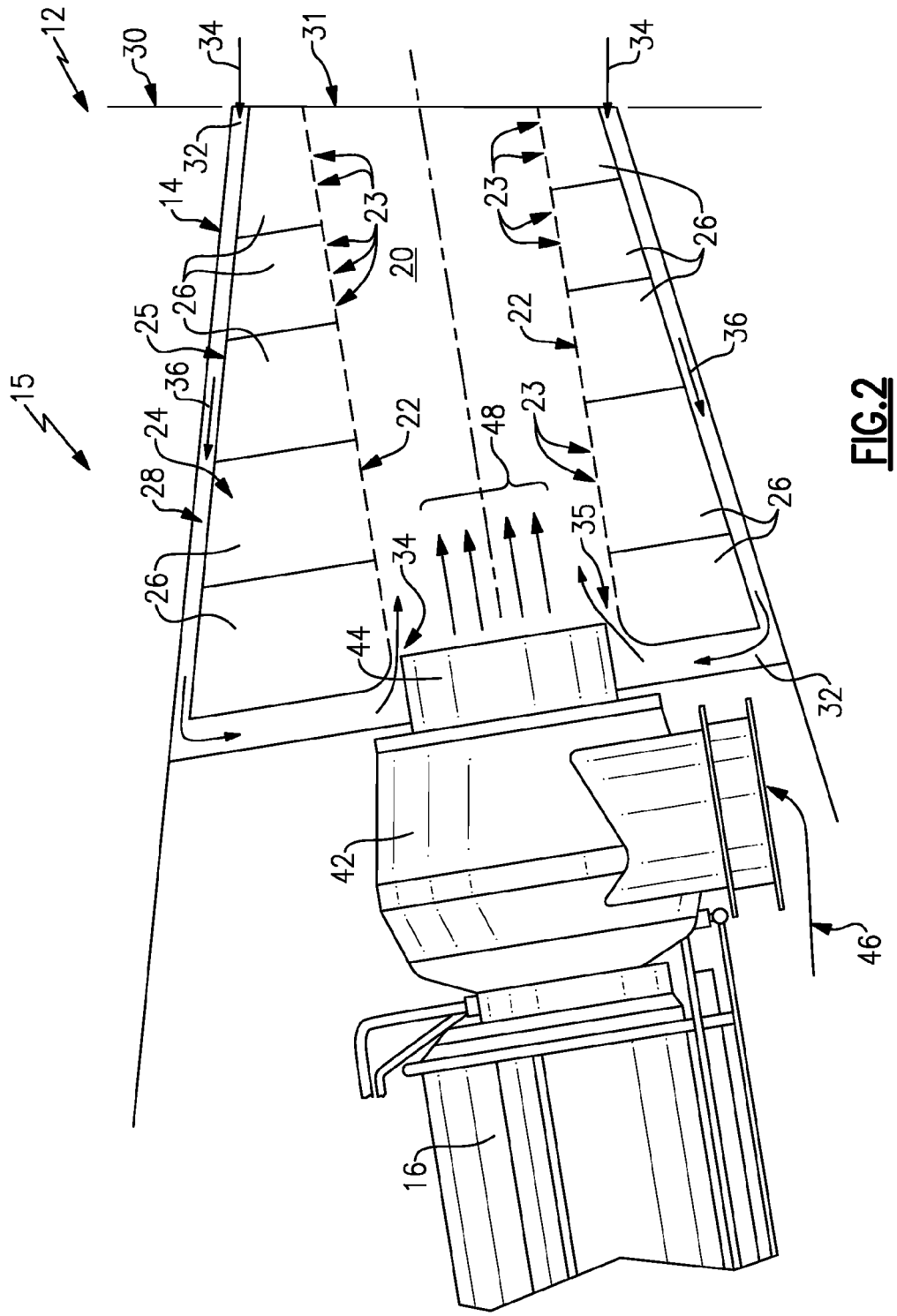
FIG. 2 is a further view of the example silencer.

Referring to FIG. 2, with continued reference to FIG. 1, the example exhaust duct 20 includes an inner surface 22. The inner surface 22 includes a porous inner surface that is provided by a plurality of openings 23 forming a perforated inner surface that communicates noise and other sound energy to the silencer 24. The inner surface 22 may also include other porous structures that provide for the communication of sound energy into the exhaust silencer 24. The example silencer 24 includes a plurality of baffles 26 that are each in communication with the exhaust duct 20 through at least some of the plurality of openings 23. The baffles 26 operate to absorb sound energy and dissipate that energy as heat. The baffles 26 may also be configured as a resonance chamber to negate noise at specific frequencies. The heat generated in the silencer 24 by the sound absorption and through thermal contact with the exhaust duct 20 is managed to prevent detrimental effects to the skin 14.

In conventional tail cone assemblies 12, an outer surface 25 of the exhaust silencer 24 may be surrounded with a thermally insulating material that can reduce the amount of space for the silencer 24 and add weight. The disclosed outer surface 25 of the example exhaust silencer 24 is surrounded by passage 28 that defines a path for cooling air. The example passage 28 is annular and substantially surrounds the outer surface 25 of the exhaust silencer 24. The passage 28 is disposed between the outer surface 25 of the exhaust silencer 24 and the skin 14. Cooling air flow through the passages 28 absorbs heat generated in the exhaust silencer 24 and exhaust duct 20 to control the amount of thermal energy communicated to the skin 14. The heat absorbed by cooling air flow through the passages 28 is exhausted way from the skin 14 and other aircraft components.

The examples passage 28 is disposed in thermal contact with the exhaust silencer 24. More specifically the exhaust passage 28 is in thermal contact with the outer surface 25 of the baffles 26 of the exhaust silencer 24.

The example passage 28 is in communication with an ambient environment through opening 34. The opening 34 is disposed within the end plane 30 and is substantially annular. Air from outside the aircraft is drawn into the passages 28 through the opening 34 and passes through the passage 28 toward an annular passage 32. The annular passage 32 is disposed at a forward most end of the exhaust duct 20 and is in communication with the exhaust duct 20 through an outlet 35. The example outlet 35 is annular and disposed adjacent a cooling air eductor 44. The cooling air eductor 44 generates a pressure differential that drives airflow through the passages 28 and the outlet 35.

The example APU 10 of FIG. 1 includes an air inlet 38 through which air 40 is drawn for operation of the gas turbine engine 16. Air drawn in through the inlet 38 is also utilized by an oil cooler eductor 42. The oil cooler eductor 42 generates airflow utilized by an oil cooling system of the gas turbine engine 16. Air indicated at 46 is drawn into the oil cooler eductor 42 to cool oil and then is exhausted with exhaust gases 48 generated by the gas turbine engine 16. Other oil cooling devices and systems could also be utilized within the scope of this disclosure.

An air flow generator produces the desired air flow into and through the passage 28. In this example, the air flow generator is a cooling air eductor 44 that generates a pressure differential by increasing airflow past the outlet 35. The increased airflow past the outlet 35 generates a low pressure area that draws air through the passages 28. The generated airflow further provides for the suction of air through the opening 34 at the end plane 30. Air drawn from the outside environment is significantly cooler relative to the hot exhaust gases 48 directed through the exhaust duct 20. The cooling air flow indicated at 36 is drawn through the passages 28 in thermal contact with the exhaust silencer 24 and absorbs heat from the exhaust silencer 24. The cooling air flow 36 draws heat away from the exhaust silencer 24 and flows toward the outlet 35 and the cooling air eductor 44. The now heated cooling air 36 is then passed into the exhaust duct 20 through the outlet 35 and is exhausted out through the exhaust opening 31.

The example cooling air eductor 44 includes an annular shape that cooperates with the outlet 35 within the exhaust duct 20. The high velocity APU exhaust gas 48 causes a low pressure region at the outlet 35 to entrain by motive flow cooling air 36 through opening 34. The increased flow of the cooling air 36 creates the desired low pressure zone that draws air through the opening 34 and passages 28. As the cooling air 36 flows from the opening 34 forward toward the annular passage 32 and the outlet 35 within the passages 28, the cooling air 36 absorbs heat from the exhaust silencer 24.

As appreciated, the cooling air eductor 44 is shown by way of example and other configurations of eductors could be utilized to provide the desired driving force for drawing air through the passage 28. Moreover, other air flow generators, such as a fan or other known devices may be utilized to generate the desired cooling air flow 36. In this example, the cooling air eductor 44 passively creates the driving force that draws cooling through the passages 28. This passive generation of air flow does not increase a load on the APU or require external power sources such as a fan would require and therefore not only provides the cooling air flow required to maintain the outer surface 25 of the exhaust silencer 24 and skin 14 at a desired temperature but also substantially reduces the need for insulation materials.

Figure 3:
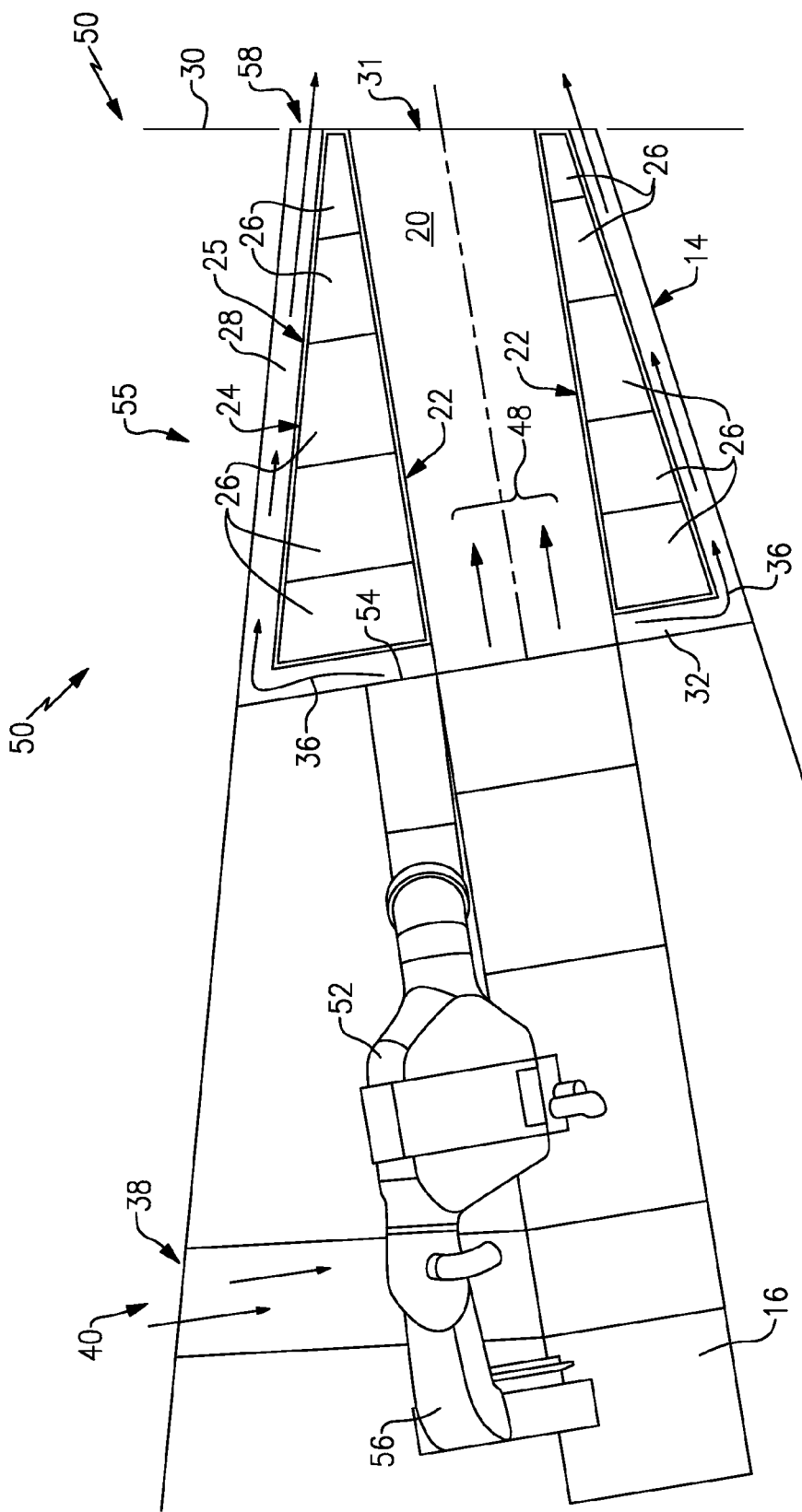
FIG. 3 is a schematic view of another example silencer.
Figure 4:
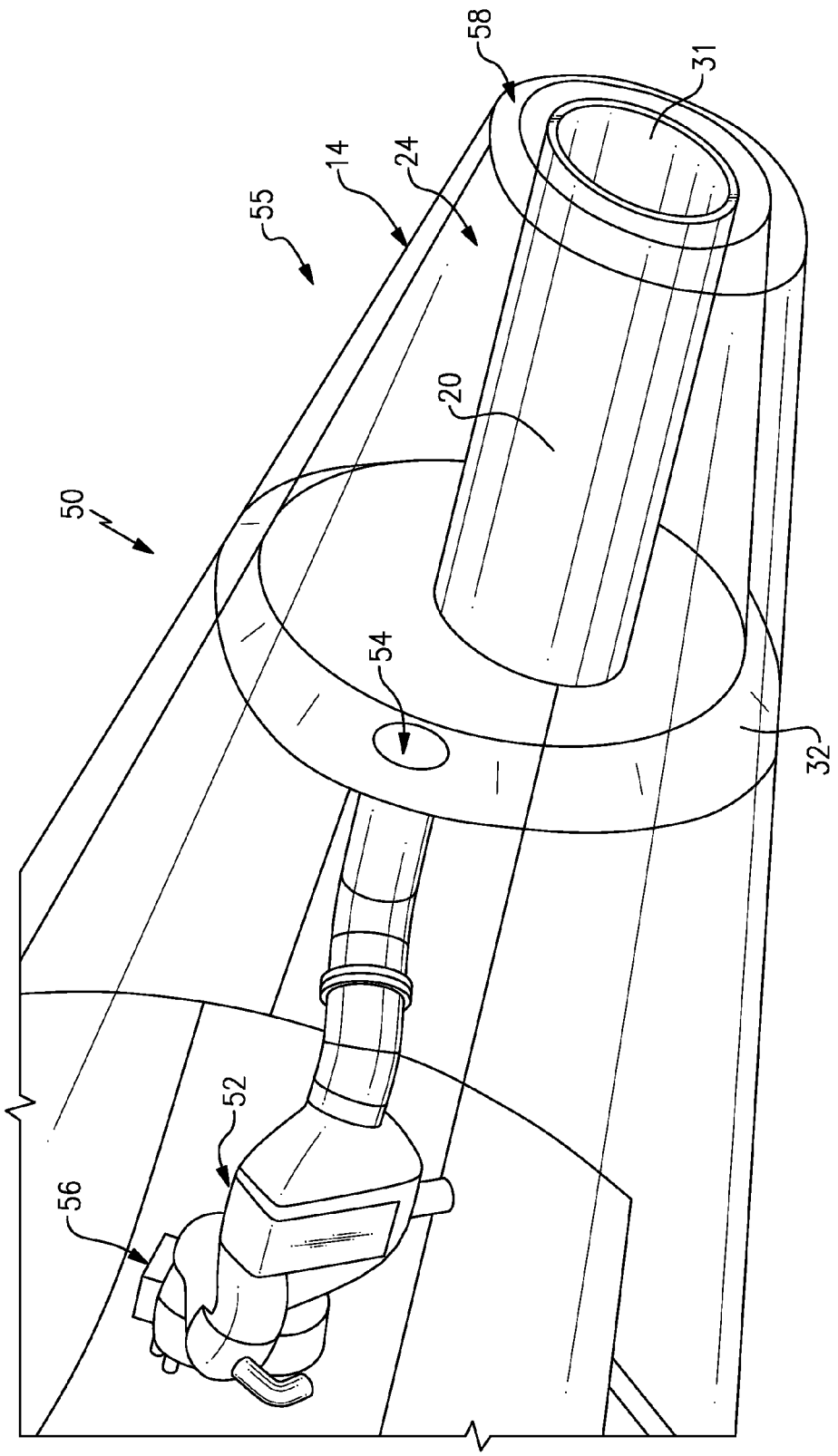
FIG. 4 is a perspective view of the example silencer shown in FIG. 3.

Referring to FIGS. 3 and 4, another example APU noise reduction system 55 or exhaust silencer cooling system 55 in tail cone assembly 50 includes the exhaust duct 20 through which exhaust gasses 48 from the gas turbine engine 16 are directed out through the end opening 31. In this example the air flow generator is provided by a cooling fan 56 for oil cooler 52. The cooling fan 56 draws air 40 from the inlet 38 and forces it into the passage 28 through an inlet 54. The inlet 54 is disposed in the annular passage 32 that surrounds a forward end of the exhaust duct 20.

The oil cooler 52 cools oil utilized by the APU 10 using air drawn through the inlet 38. Optionally, air could be drawn from alternate locations and ducts by the fan 56 and through the oil cooler 52. The cooling air is injected through the oil cooler 52 and then exhausted through the inlet 54 into the annular passage 32. Air in the passage 32 is pushed out to the passage 28 surrounding the silencer 24. Although the cooling air exhausted from the oil cooler 52 has absorbed some heat from the oil, the air remains significantly cooler then the hot exhaust gases 48.

The cooling air flow 36 progressively absorbs heat as it flows in thermal contact with the outer surface 25 of the exhaust silencer 24 toward the outlet 58 at the end plane 30. Accordingly, in this example the oil cooler fan 56 is utilized to drive cooling air through the passage 28. The cooling air flow 36 in turn absorbs and removes heat from the outer surface 25 of the silencer 24 and the exhaust duct 20.

Accordingly, the outer surface 25 of the example exhaust silencer 24 and exhaust duct 20 are cooled by a flow of cooling air flow. The flow of cooling air carries away heat generated in the exhaust silencer 24 and exhaust duct 20 to protect materials and components not compatible with exposure to the elevated temperatures of exhaust gases 48. The disclosed cooling method and features substantially reduce and/or eliminating the need for additional insulating material. In addition, the cooling passage 28 requires significantly less space while providing increased cooling thereby allowing for the baffles 26 of the exhaust silencer 24 to be of an increased size to provide a more efficient noise attenuating function.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. An auxiliary power unit noise reduction system comprising:
    an exhaust duct;
    an exhaust silencer surrounding the exhaust duct, the exhaust silencer including a plurality of baffles in communication with the exhaust duct;
    a passage disposed around the exhaust silencer and in thermal communication with the exhaust silencer, wherein the passage includes an opening within a plane transverse to a longitudinal axis of the exhaust duct and common with a terminal end of the exhaust duct; and
    a source of cooling air flow that draws cooling air in through the opening and into the passage to control a temperature of the exhaust silencer.

2. The auxiliary power unit noise reduction system as recited in claim 1, wherein the exhaust duct includes a porous inner surface and the exhaust silencer comprises a plurality of baffles in communication with the exhaust duct through the porous inner surface.

3. The auxiliary power unit noise reduction system as recited in claim 1, wherein the passage is in thermal communication with an outer surface of the exhaust silencer and an inner surface of an outer skin.

4. The auxiliary power unit noise reduction system as recited in claim 1, wherein the passage comprises a passage surrounding an outer surface of the exhaust silencer.

5. The auxiliary power unit noise reduction system as recited in claim 1, including an eductor disposed at an inlet to the exhaust duct, the eductor adapted for drawing air into the opening within the plane common with a terminal end of the exhaust duct, through the passage and into the inlet of the exhaust duct.

6. The auxiliary power unit noise reduction system as recited in claim 1, including a fan driving air received through an air inlet through the passage and out the opening within the plane common with the terminal end of the exhaust duct.

7. The auxiliary power unit noise reduction system as recited in claim 6, including an annular chamber in communication with the exhaust duct and the passage for communicating cooling air flow into the exhaust duct.

8. An exhaust silencer cooling system for a gas turbine engine comprising:
 an exhaust silencer disposed about an exhaust duct, wherein the exhaust duct is configured to receive exhaust gases from the gas turbine engine and the exhaust silencer includes a plurality of baffles and an outer surface;
 a passage for cooling air that is disposed about the outer surface and is in thermal communication with the outer surface of the exhaust silencer, wherein the passage extends between a first opening to the passage communicating cooling air to an inlet of the exhaust duct, and a second opening disposed within a plane transverse to a longitudinal axis of the exhaust duct common with a terminal end of the exhaust duct; and
 a source of cooling air flow in communication with the passage for creating cooling air flow from the second opening into the passage and out the first opening into the exhaust duct for removing heat.

9. The exhaust silencer cooling system as recited in claim 8, wherein the exhaust silencer comprises a plurality of baffles in communication with the exhaust duct for dissipating noise energy.

10. The exhaust silencer cooling system as recited in claim 8, wherein the passage is disposed about an outer surface of the exhaust silencer.

11. The exhaust silencer cooling system as recited in claim 8, wherein the passage comprises an annular passage disposed about the exhaust silencer.

12. The exhaust silencer cooling system as recited in claim 8, wherein the source of cooling air comprises an air flow generator draws air in through the second opening through the passage and into the exhaust duct through the first opening.

13. The exhaust silencer cooling system as recited in claim 8, wherein an air flow generator pushes cooling air through the passage and out the second opening to an external environment.

14. A method of cooling an exhaust silencer comprising:
 surrounding an exhaust duct with an exhaust silencer;
 placing a passage for cooling air in thermal communication with the exhaust silencer, wherein the passage surrounds an outer surface of the exhaust silencer and included an opening adjacent an aft open end of the exhaust duct;
 communicating noise energy through openings in the exhaust duct to the exhaust silencer; and
 flowing cooling air through the passage for removing heat from the exhaust silencer including flowing cooling air into the passage through the opening adjacent the aft open end of the exhaust duct.

15. The method as recited in claim 14, including the step of drawing cooling air into the passage from the opening adjacent aft open end of the exhaust duct and exhausting the cooling air into a forward end of the exhaust duct.

16. The method as recited in claim 14, including the step of driving air from a forward end of the passage through to the opening at the aft open end of the exhaust duct.

* * * * *